(12) United States Patent
Murschall et al.

(10) Patent No.: US 6,649,247 B2
(45) Date of Patent: **\*Nov. 18, 2003**

(54) SEALABLE, FLAME-RESISTANT, CO-EXTRUDED, BIAXIALLY ORIENTED FOIL THAT IS MAT ON ONE SIDE AND A METHOD FOR PRODUCING AND USING SAME

(75) Inventors: Ursula Murschall, Nierstein (DE);
Ulrich Kern, Ingelheim (DE);
Guenther Crass, Taunusstein (DE);
Herbert Peiffer, Mainz (DE); Hans Mahl, Walluf (DE)

(73) Assignee: Mitsubishi Polyester Film GmbH, Wiesbaden (DE)

( * ) Notice: Subject to any disclaimer, the term of this patent is extended or adjusted under 35 U.S.C. 154(b) by 0 days.

This patent is subject to a terminal disclaimer.

(21) Appl. No.: 10/182,455

(22) PCT Filed: Jan. 10, 2001

(86) PCT No.: PCT/EP01/00181

§ 371 (c)(1),
(2), (4) Date: Jul. 26, 2002

(87) PCT Pub. No.: WO01/60610

PCT Pub. Date: Aug. 23, 2001

(65) Prior Publication Data

US 2003/0118817 A1 Jun. 26, 2003

(30) Foreign Application Priority Data

Feb. 19, 2000 (DE) ......................... 100 07 723

(51) Int. Cl.$^7$ .................. B32B 27/08; B32B 27/18; B32B 27/36; B32B 31/16; B32B 31/30
(52) U.S. Cl. .............. 428/141; 428/486; 428/910; 428/346; 428/347; 428/349; 428/355 R; 428/903.3; 264/288.4; 264/290.2; 106/15.05; 106/18.11; 106/18.14; 106/18.18; 106/18.31

(58) Field of Search ................ 428/141, 480, 428/910, 346, 347, 349, 355 R, 903.3; 264/288.4, 290.2; 106/15.05, 18.11, 18.14, 18.18, 18.31

(56) References Cited

U.S. PATENT DOCUMENTS

| | | | | |
|---|---|---|---|---|
| 5,173,357 A | * | 12/1992 | Nakane et al. | 428/220 |
| 5,955,181 A | * | 9/1999 | Peiffer et al. | 428/212 |
| 6,358,604 B1 | * | 3/2002 | Peiffer et al. | 428/336 |
| 6,423,401 B2 | * | 7/2002 | Peiffer et al. | 428/216 |
| 2002/0014944 A1 | * | 2/2002 | Dinsmore | 337/157 |

FOREIGN PATENT DOCUMENTS

| | | |
|---|---|---|
| DE | 23 46 787 A1 | 3/1975 |
| EP | 0 144 878 A1 | 3/1975 |
| EP | 0 035 835 A1 | 9/1981 |
| EP | 0 432 886 A2 | 6/1991 |
| EP | 0 515 096 A2 | 11/1992 |
| EP | 0 712 719 A1 | 5/1996 |
| EP | 0 903 222 A2 | 3/1999 |
| EP | 0 947 982 A2 | 10/1999 |
| EP | 0 976 548 A2 * | 2/2000 |
| GB | 1 465 973 | 3/1977 |
| GB | 2 344 596 A | 6/2000 |
| WO | WO 98/06575 A1 | 2/1998 |

* cited by examiner

*Primary Examiner*—Vivian Chen
(74) *Attorney, Agent, or Firm*—ProPat, L.L.C.

(57) ABSTRACT

The invention relates to a sealable, flame-retardant, coextruded, biaxially oriented polyester film with one matt side, and composed of at least one base layer B and of, applied to the two sides of this base layer, a sealable outer layer A and a matt outer layer C. The film also comprises at least one flame retardant. The invention further relates to the use of the film and to a process for its production.

19 Claims, No Drawings

SEALABLE, FLAME-RESISTANT, CO-EXTRUDED, BIAXIALLY ORIENTED FOIL THAT IS MAT ON ONE SIDE AND A METHOD FOR PRODUCING AND USING SAME

The invention relates to a sealable, flame-retardant, coextruded, biaxially oriented polyester film with one matt side, and composed of at least one base layer B and of, applied to the two sides of this base layer, a sealable outer layer A and a matt outer layer C. The film also comprises at least one flame retardant. The invention further relates to the use of the film and to a process for its production.

BACKGROUND OF THE INVENTION

GB-A 1 465 973 describes a coextruded, two-layer polyester film in which one layer is composed of isophthalic acid-containing and terephthalic acid-containing copolyesters and in which the other layer is composed of polyethylene terephthalate. The specification gives no useful information concerning the sealing performance of the film. Lack of pigmentation means that the process for producing the film is not reliable (the film cannot be wound) and that there are limitations on further processing of the film.

EP-A-0 035 835 describes a coextruded sealable polyester film which has particles admixed in the sealable layer to improve winding and processing performance, the median size of these particles exceeding the thickness of the sealable layer. The particulate additives form surface protrusions which prevent undesired blocking and sticking to rollers or guides. No further detail is given concerning incorporation of antiblocking agents in the other, non-sealable layer of the film. It is uncertain whether this layer comprises antiblocking agents. The sealing performance of the film is impaired by selecting particles with diameters greater than the sealing layer, and by selecting the concentrations given in the examples. The specification gives no information on the sealing temperature range of the film. Seal seam strength is measured at 140° C. and is in the range from 63 to 120 N/m (from 0.97 to 1.8 N/15 m of film width).

EP-A-0 432 886 describes a coextruded multilayer polyester film which has one surface on which a sealable layer has been arranged and a second surface on which an acrylate layer has been arranged. Here, too, the sealable outer layer may be composed of isophthalic acid-containing and terephthalic acid-containing copolyesters. The reverse-side coating gives the film improved processing performance. The specification gives no information concerning the sealing range of the film. Seal seam strength is measured at 140° C. For a sealing layer of thickness 11 µm the seal seam strength given is 761.5 N/m (11.4 N/15 mm). A disadvantage of the reverse-side acrylate coating is that this side is not then sealable with respect to the sealable outer layer. The uses of the film are therefore highly restricted.

EP-A-0 515 096 describes a coextruded, multilayer sealable polyester film which comprises an additional additive on the sealable layer. The additive may comprise inorganic particles, for example, and is preferably applied in an aqueous layer to the film during its production. The result is said to be that the film retains good sealing properties and processes well. The reverse side comprises only very few particles, which pass into this layer mainly via the regrind. Again, the specification gives no information concerning the sealing temperature range of the film. Seal seam strength is measured at 140° C. and is more than 200 N/m (3 N/15 mm). For a sealing layer of thickness 3 µm the seal seam strength given is 275 N/m (4.125 N/15 mm).

WO 98/06575 describes a coextruded multilayer polyester film which comprises a sealable outer layer and a non-sealable base layer. The base layer here may be composed of one or more layers, the interior layer being in contact with the sealable layer. The other (exterior) layer then forms the second non-sealable outer layer. Here, too, the sealable outer layer may be composed of isophthalic acid-containing and terephthalic acid-containing copolyesters, but no antiblocking particles are present in these. In addition, the film also comprises at least one UV absorber, which is added to the base layer in a weight ratio of from 0.1 to 10%. The base layer has conventional antiblocking agents. The film has good sealability, but does not have the desired processing performance and also has shortcomings in optical properties. The film may also have a matt surface, but then has high haze, which is undesirable.

DE-B 23 46 787 describes a flame-retardant raw material. Besides the raw material, its use to give films and fibers is also claimed. The following shortcomings were apparent during production of film using this claimed phospholane-modified raw material the raw material mentioned is susceptible to hydrolysis and has to be very effectively predried. When the raw material is dried using prior art dryers it cakes, and production of a film is possible only under very difficult conditions, the films produced, under uneconomic conditions, also embrittle at high temperatures, i.e. the mechanical properties decline sharply as a result of embrittlement, making the film unusable; this embrittlement arises after as little as 48 hours at high temperature.

It is an object of the present invention to eliminate the disadvantages of the prior art.

BRIEF DESCRIPTION OF THE INVENTION

The invention provides a sealable, flame-retardant, coextruded, biaxially oriented polyester film with one matt side and with at least one base layer B, and with a sealable outer layer A, and also with a matt outer layer C, where a flame retardant is present in at least one layer, where the sealable outer layer A has a minimum sealing temperature of 110° C. and a seal seam strength of at least 1.3 N/15 mm, and the topographies of the two outer layers A and C have the following features.

Sealable outer layer A:

$R_a$<30 nm

Value measured for gas flow from 500 to 4000 s

Non-sealable, matt outer layer C:

200 nm<$R_a$<1000 nm

Value measured for gas flow <50 s.

DETAILED DESCRIPTION OF THE INVENTION

The invention therefore provides a sealable, transparent, flame-retardant, sealable, coextruded and biaxially oriented polyester film with one matt side and not having the disadvantages of the prior art films mentioned and having in particular very good sealability, and capable of being produced cost-effectively, and which has improved processability, and improved optical properties. In particular, it is flame-retardant and does not embrittle after exposure to high temperature.

Success has been achieved in extending the sealing range of the film at low temperatures, increasing the seal seam strength of the film, and at the same time providing film handling which is better than that known from the prior art. It has moreover been ensured that the film can also be processed on high-speed processing machinery. During production of the film it is possible to introduce directly-arising regrind at a concentration of up to 60% by weight, based on the total weight of the film to the extrusion process without any significant resultant adverse effect on the physical properties of the film.

Flame retardancy means that in what is known as a fire protection test the transparent film meets the requirements of DIN 4102 Part 2 and in particular the requirements of DIN 4102 Part 1 and can be assigned to building materials classification B2 and in particular B1 for low-flammability materials.

The film is also intended to pass the UL 94 test "Vertical Burning Test for Flammability of Plastic Material", thus permitting its classification in class 94 VTM-0. This means that the film has ceased to burn 10 seconds after removal of the Bunsen burner, and that after 30 seconds no smoldering is observed, and moreover no burning drops are observed.

Cost-effective production includes the capability of the raw materials or the raw material components needed to produce the flame-retardant film to be dried using industrial dryers of the prior art. It is significant that the raw materials do not cake and do not undergo thermal degradation. These industrial dryers of the prior art include vacuum dryers, fluidized-bed dryers, and fixed-bed dryers (tower dryers).

These dryers operate at temperatures from 100 to 170° C., at which the flame-retardant raw materials of the prior art used hitherto generally cake and have to be dug out, making film production impossible.

In vacuum dryers, which have the gentlest drying action, the raw material passes through a range of temperature of from about 30 to 130° C. at a reduced pressure of 50 mbar. A process known as post-drying is then required, in a hopper at temperatures of from 100 to 130° C. and with a residence time of from 3 to 6 hours. Even here, the known raw material cakes to an extreme extent.

No embrittlement on short-term exposure to high temperature means that after 100 hours of heat-conditioning at 100° C. in a circulating-air drying cabinet the film does not become brittle and does not have poor mechanical properties.

Good mechanical properties include, inter alia, high modulus of elasticity ($E_{MD}$>3200 N/mm$^2$; $E_{TD}$>3500 N/mm$^2$) and also values for tensile stress at break (in MD>100 N/mm$^2$; in TD>130 N/mm$^2$).

According to the invention, the film generally has at least three layers, the layers then encompassed being the base layer B, the sealable outer layer A, and the matt outer layer C.

At least 90% by weight of the base layer B of the film is generally composed of a thermoplastic polyester. Polyesters suitable for this purpose are those made from ethylene glycol and terephthalic acid (polyethylene terephthalate, PET), from ethylene glycol and naphthalene-2,6-dicarboxylic acid (polyethylene 2,6-naphthalate, PEN), from 1,4-bishydroxymethylcyclohexane and terephthalic acid (poly-1,4-cyclohexanedimethylene terephthalate, PCDT), or else made from ethylene glycol, naphthalene-2,6-dicarboxylic acid and biphenyl-4,4'-dicarboxylic acid (polyethylene 2,6-naphthalate bibenzoate, PENBB). Particular preference is given to polyesters at least 90 mol %, preferably at least 95 mol %, of which is composed of ethylene glycol units and terephthalic acid units, or of ethylene glycol units and naphthalene-2,6-dicarboxylic acid units. The remaining monomer units derive from those other aliphatic, cycloaliphatic or aromatic diols and, respectively, dicarboxylic acids which can also be present in layer A (or layer C).

Other examples of suitable aliphatic diols are diethylene glycol, triethylene glycol, aliphatic glycols of the formula HO—(CH$_2$)$_n$—OH, where n is an integer from 3 to 6 (in particular 1,3-propanediol, 1,4-butanediol, 1,5-pentanediol and 1,6-hexanediol) and branched aliphatic glycols having up to 6 carbon atoms. Among the cycloaliphatic diols, mention should be made of cyclohexanediols (in particular 1,4-cyclohexanediol). Examples of other suitable aromatic diols have the formula HO—C$_6$H$_4$—X—C$_6$H$_4$—OH, where X is —CH$_2$—, —C(CH$_3$)$_2$—, —C(CF$_3$)$_2$—, —O—, —S— or —SO$_2$—. Bisphenols of the formula HO—C$_6$H$_4$—C$_6$H$_4$—OH are also very suitable.

Other aromatic dicarboxylic acids are preferably benzenedicarboxylic acids, naphthalene dicarboxylic acids (such as naphthalene-1,4- or -1,6-dicarboxylic acid), biphenyl-x,x'-dicarboxylic acids (in particular biphenyl-4,4'-dicarboxylic acid), diphenylacetylene-x,x'-dicarboxylic acids (in particular diphenylacetylene-4,4'-dicarboxylic acid) or stilbene-x,x'-dicarboxylic acids. Among the cycloaliphatic dicarboxylic acids mention should be made of cyclohexanedicarboxylic acids (in particular cyclohexane-1,4-dicarboxylic acid). Among the aliphatic dicarboxylic acids, the C$_3$–C$_{19}$ alkanediacids are particularly suitable, and the alkane moiety here may be straight-chain or branched.

One way of preparing the polyesters is the transesterification process. Here, the starting materials are dicarboxylic esters and diols, which are reacted using the customary transesterification catalysts, such as the salts of zinc, of calcium, of lithium, of magnesium or of manganese. The intermediates are then polycondensed in the presence of well-known polycondensation catalysts, such as antimony trioxide or titanium salts. Another equally good preparation method is the direct esterification process in the presence of polycondensation catalysts. This starts directly from the dicarboxylic acids and the diols.

The sealable outer layer A coextruded onto the base layer B has a structure based on polyester copolymers and is substantially composed of amorphous copolyesters predominantly made of isophthalic acid units and of terephthalic acid units and of ethylene glycol units. The other monomer units derive from those other aliphatic, cycloaliphatic, or aromatic diols and, respectively, dicarboxylic acids which can also be present in the base layer. Preferred copolyesters which provide the desired sealing properties are those composed of ethylene terephthalate units and of ethylene isophthalate units, and of ethylene glycol units. The proportion of ethylene terephthalate is from 40 to 95 mol % and the corresponding portion of ethylene isophthalate is from 60 to 5 mol %. Preference is given to copolyesters where the proportion of ethylene terephthalate is from 50 to 90 mol % and the corresponding proportion of ethylene isophthalate is from 50 to 10 mol %, and highly preferred copolyesters are those where the proportion of ethylene terephthalate is from 60 to 85 mol % and the corresponding proportion of ethylene isophthalate is from 40 to 15 mol %.

In its preferred embodiment, the matt outer layer C comprises a blend or a mixture made from two components I and II and, where appropriate, comprises added additives in the form of inert inorganic antiblocking agents.

Component I of the mixture or of the blend is a polyethylene terephthalate homopolymer or polyethylene terephthalate copolymer, or a mixture made from polyethylene terephthalate homo- or copolymers.

Component II of the copolymer or of the mixture or of the blend is a polyethylene terephthalate copolymer which is composed of the condensation product of the following monomers or of their derivatives capable of forming polyesters:

A) from 65 to 95 mol % of isophthalic acid;
B) from 0 to 30 mol % of at least one aliphatic dicarboxylic acid having the formula $HOOC(CH_2)_nCOOH$, where n is in the range from 1 to 11;
C) from 5 to 15 mol % of at least one sulfomonomer containing an alkali metal sulfonate group on the aromatic moiety of a dicarboxylic acid;
D) a copolymerizable aliphatic or cycloaliphatic glycol having from 2 to 11 carbon atoms, in the stoichiometric amount necessary to form 100 mol % of condensate;

where each of the percentages is based on the total amount of monomers forming component II. For a detailed description of component II see also EP-A-0 144 878, which is expressly incorporated herein by way of reference.

For the purposes of the present invention, mixtures are mechanical mixtures prepared from the individual components. For this, the individual constituents are generally combined in the form of small-dimensioned compressed moldings, e.g. lenticular or bead-shaped pellets, and mixed with one another mechanically, using a suitable agitator. Another way of producing the mixture is to feed components I and II in pellet form separately to the extruder for the outer layer of the invention, and to carry out mixing in the extruder and/or in the downstream systems for transporting the melt.

For the purposes of the present invention, a blend is an alloy-like composite of the individual components I and II which can no longer be separated into the initial constituents. A blend has properties like those of a homogeneous material and can therefore be characterized by appropriate parameters.

The ratio (ratio by weight) of the two components I and II of the outer layer mixture or of the blend can be varied within wide limits and depends on the intended use of the multilayer film. The ratio of components I and II is preferably in the range from I:II=10:90 to I:II=95:5, preferably from I:II=20:80 to I:II=95:5, and in particular from I:II=30:70 to I:II=95:5.

The desired sealing properties, the desired degree of mattness, and the desired processing properties of the film of the invention are obtained by combining the properties of the copolyester used for the sealable outer layer with the topographies of the sealable outer layer A and of the non-sealable, matt outer layer C.

The minimum sealing temperature of 110° C. and the seal seam strength of at least 1.3 N/15 mm is achieved if the copolymers described in more detail above are used for the sealable outer layer A. The best sealing properties are obtained for the film if no other additives, in particular no inorganic or organic fillers, are added to the copolymer. The lowest minimum sealing temperature and the highest seal seam strengths are then obtained for a prescribed copolyester. However, the film then has poor handling, since the surface of the sealable outer layer A has a severe tendency toward blocking. The film is difficult to wind and is unsuitable for further processing on high-speed packaging machinery. To improve the handling of the film and its processability it is necessary to modify the sealable outer layer A. This is best achieved with the aid of suitable antiblocking agents of a selected size, a certain concentration of which is added to the sealable layer, and specifically in such a way as firstly to minimize blocking and secondly to give only insignificant impairment of sealing properties. This desired combination of properties may be achieved if the topography of the sealable outer layer A is characterized by the following parameter set:

The roughness of the sealable outer layer, characterized by the $R_a$ value, is generally smaller than 30 nm, preferably smaller than 25 nm. Otherwise, the sealing properties for the purposes of the present invention are adversely affected.

The value measured for the gas flow is to be in the range from 500 to 4000 s, preferably from 600 to 3500 s. At values below 500 s, the sealing properties are adversely affected for the purposes of the present invention, and at values above 4000 s the handling of the film become poor.

The non-sealable, matt outer layer C is characterized by the following parameter set The roughness of the matt outer layer, characterized by the $R_a$ value, is in the range from 200 to 1000 nm, preferably from 220 to 900 nm. Smaller values than 200 nm have adverse effects on the winding performance and the processing performance of the film, and also on the degree of mattness of the surface. Greater values than 1000 nm impair the optical properties (haze) of the film.

The value measured for gas flow should be in the range $\leq 50$ s, preferably $\leq 45$ s. At values above 50, the degree of mattness of the film is adversely affected.

The film of the invention comprises at least one flame retardant, which is metered in by way of what is known as masterbatch technology directly during film production, the concentration of the flame retardant being in the range from 0.5 to 30.0% by weight, preferably from 1.0 to 20.0% by weight, based on the weight of the layer of the crystallizable thermoplastic. The ratio of flame retardant to thermoplastic during production of the masterbatch is generally kept within from 60:40% by weight to 10:90% by weight.

Typical flame retardants include bromine compounds, chloroparaffins and other chlorine compounds, antimony trioxide, and aluminum trihydrates, but the halogen compounds are disadvantageous due to the production of halogen-containing by-products. Other serious disadvantages are the low lightfastness of a film in which they are present, and the evolution of hydrogen halides in the event of a fire.

Examples of suitable flame retardants used according to the invention are organophosphorus compounds, such as carboxyphosphinic acids, anhydrides of these, and dimethyl methylphosphonate. It is significant for the invention that the organophosphorus compound is soluble in the thermoplastic, since otherwise the requirements for optical properties are not met.

Since the flame retardants generally have some susceptibility to hydrolysis, it can be advisable to make concomitant use of a hydrolysis stabilizer.

It was therefore more than surprising that the use of masterbatch technology and of appropriate predrying and/or precrystallization, and, where appropriate, use of small amounts of a hydrolysis stabilizer permit economic production of a flame-retardant film with the required property profile without caking in the dryer, and that the film does not embrittle after exposure to high temperature. In addition, neither any evolution of gases nor any formation of deposits was observed in the production process.

It was very surprising that alongside this excellent result with the required flame retardancy There is no adverse effect on the Yellowness Index of the film, within the limits of accuracy of measurement, when comparison is made with an unmodified film.

Neither any evolution of gases nor any formation of die deposits nor any condensation of vapor onto frames occurs, and therefore the film has excellent optical properties, excellent profile, and extremely good layflat.

The flame-retardant film has extremely good stretchability, and is therefore capable of stable production in a reliable process on high-speed film lines at speeds of up to 420 m/min.

A film of this type is therefore also cost-effective.

It is moreover very surprising that it is even possible to reuse the regrind generated from the films or from the moldings without any adverse effect on the Yellowness Index of the film.

In one preferred embodiment, the film of the invention comprises a crystallizable polyethylene terephthalate as main constituent, and as flame retardant from 1.0 to 20.0% by weight of an organophosphorus compound soluble in the polyethylene terephthalate, and from 0.1 to 1.0% by weight of a hydrolysis stabilizer.

Phenolic stabilizers, alkali metal/alkaline earth metal stearates, and/or alkali metal/alkaline earth metal carbonates are particularly suitable. Preference is given to phenolic stabilizers in amounts of from 0.05 to 0.6% by weight, in particular from 0.15 to 0.3% by weight, and with a molar mass of more than 500 g/mol. Pentaerythrityl tetrakis-3-(3,5-di-tert-butyl-4-hydroxyphenyl)propionate or 1,3,5-trimethyl-2,4,6-tris(3,5-di-tert-butyl-4-hydroxybenzyl)benzene are particularly advantageous.

In the three-layer embodiment, the flame retardant is preferably present in the non-sealable outer layer C. However, if required, there may also be flame retardants in the base layer B or in the sealable outer layer A. The concentration of the flame retardant(s) is based here on the weight of the thermoplastics in the layer provided with flame retardants.

Very surprisingly, fire protection tests to DIN 4102 and the UL test have shown that in the case of a three-layer film it is fully sufficient to provide flame retardant in the outer layers of thickness from 0.3 to 2.5 $\mu$m in order to achieve improved flame retardancy. If required, and if fire-protection requirements are stringent, the core layer may also have flame retardant, at what is known as a base level of provision.

The flame-retardant, multilayer films produced by known coextrusion technology are therefore of economic interest when compared with monofilms bulk-modified at high concentrations, since markedly less flame retardant is needed.

Furthermore, measurements have shown that the film of the invention does not embrittle on exposure to temperatures of 100° C. for a prolonged period. This is more than surprising. This result is attributable to the synergistic action of appropriate precrystallization, predrying, masterbatch technology, and hydrolysis stabilizer.

Furthermore, the film is capable of problem-free recycling without pollution of the environment and without loss of mechanical properties, making it suitable for use as short-lived advertising placards, for example, or in the construction of exhibition stands, or for other promotional items, where fire protection is desired.

Surprisingly, even films of the invention in the thickness range from 5 to 300 $\mu$m give compliance with construction material specifications B2 and B1 to DIN 4102 and with the UL 94 test.

According to the invention, the flame retardant is added by way of masterbatch technology. The flame retardant, and the hydrolysis stabilizer where appropriate, are first completely dispersed in a carrier material. Carrier materials which may be used are the thermoplastic itself, e.g. the polyethylene terephthalate, or else other polymers which are compatible with the thermoplastic. After metering into the thermoplastic for film production the constituents of the masterbatch melt during the extrusion process and are thus dispersed in the thermoplastic.

In masterbatch technology it is important that the grain size and the bulk density of the masterbatch is similar to the grain size and the bulk density of the thermoplastic, permitting homogeneous distribution and therefore homogeneous flame retardancy.

It is significant for the invention that the masterbatch which comprises the flame retardant is precrystallized or predried. This predrying includes gradual heating of the masterbatch at subatmospheric pressure (from 20 to 80 mbar, preferably from 30 to 60 mbar, in particular from 40 to 50 mbar), with stirring, and, where appropriate, after-drying at a constant elevated temperature, likewise at subatmospheric pressure. It is preferable for the masterbatch to be charged at room temperature from a metering vessel in the desired blend together with the polymer of the base and/or outer layers and, where appropriate, with other raw material components batchwise into a vacuum dryer which traverses a temperature profile from 10 to 160° C., preferably from 20 to 150° C., in particular from 30 to 130° C., during the course of the drying time or residence time. During the residence time of about 6 hours, preferably 5 hours, in particular 4 hours, the raw material mixture is stirred at from 10 to 70 rpm, preferably from 15 to 65 rpm, in particular from 20 to 60 rpm. The resultant precrystallized or predried raw material mixture is after-dried in a downstream vessel, likewise evacuated, at temperatures of from 90 to 180° C., preferably from 100 to 170° C., in particular from 110 to 160° C., for from 2 to 8 hours, preferably from 3 to 7 hours, in particular from 4 to 6 hours.

The base layer B may also comprise conventional additives, such as stabilizers and/or antiblocking agents. The two other layers A and C may also comprise these additives. They are advantageously added to the polymer or to the polymer mixture before melting begins. Examples of stabilizers used are phosphorus compounds, such as phosphoric acid or phosphoric esters.

Typical antiblocking agents (in this context also termed pigments) are inorganic and/or organic particles, such as calcium carbonate, amorphous silica, talc, magnesium carbonate, barium carbonate, calcium sulfate, barium sulfate, lithium phosphate, calcium phosphate, magnesium phosphate, aluminum oxide, LiF, the calcium, barium, zinc or manganese salts of the dicarboxylic acids used, carbon black, titanium dioxide, kaolin, crosslinked polystyrene particles, and crosslinked acrylate particles.

Other antiblocking agents which may be selected are mixtures of two or more different antiblocking agents, and mixtures of antiblocking agents of identical makeup but different particle size. The particles may be added to each layer of the film in the respective advantageous concentrations, e.g. as a glycolic dispersion during polycondensation, or by way of masterbatches during extrusion.

Preferred particles are $SiO_2$ in colloidal or chain-type form. These particles are very effectively bonded into the polymer matrix and generate only very few vacuoles. Vacuoles generally cause haze and are therefore advantageously avoided. There is no restriction in principle on the diameters of the particles used. However, for achieving the object it has proven advantageous to use particles with an average primary particle diameter smaller than 100 nm, preferably smaller than 60 nm, and particularly preferably smaller than 50 nm, and/or particles with an average primary particle diameter greater than 1 μm, preferably greater than 1.5 μm, and particularly preferably greater than 2 μm. These latter particles should not, however, have an average particle diameter greater than 5 μm.

To achieve the abovementioned properties of the sealable film, it has proven advantageous if the particle concentration selected in the base layer B is lower than in the two outer layers A and C. In the case of a three-layer film of the type mentioned, the particle concentration in the base layer B will be in the range from 0 to 0.15% by weight, preferably from 0.001 to 0.12% by weight, and in particular from 0.002 to 0.10% by weight. There is no restriction in principle on the diameter of the particles used, but particular preference is given to particles with an average diameter greater than 1 mm.

In the advantageous embodiment, the film is composed of three layers, the base layer B and, applied to the two sides of this base layer, outer layers A and C, the outer layer A being sealable with respect to itself and with respect to the outer layer C.

To achieve the property profile mentioned for the film, the outer layer C has more pigment (i.e. higher pigment concentration) than the outer layer A. The pigment concentration in this second, matt outer layer C is in the range from 1.0 to 10.0%, advantageously from 1.5 to 10%, and in particular from 2.0 to 10%. In contrast, the other sealable outer layer A, opposite to the outer layer C, has a lower filler level of inert pigments. The concentration of the inert particles in the layer A is in the range from 0.01 to 0.2% by weight, preferably from 0.015 to 0.15% by weight, and in particular from 0.02 to 0.1% by weight.

Where appropriate, there may also be an intermediate layer between the base layer and the outer layers. This may again be composed of the polymers described for the base layers. In one particularly preferred embodiment, the intermediate layer is composed of the polyester used for the base layer. It may also comprise the conventional additives described. The thickness of the intermediate layer is generally greater than 0.3 μm and is preferably in the range from 0.5 to 15.0 μm, particularly in the range from 1.0 to 10.0 μm, and very preferably in the range from 1.0 to 5.0 μm.

In the particularly advantageous three-layer embodiment of the film of the invention, the thickness of the outer layers A and C is generally greater than 0.1 μm and is generally in the range from 0.2 to 4.0 μm, advantageously from 0.2 to 3.5 μm, in particular from 0.3 to 3 μm, and very particularly preferably from 0.3 to 2.5 μm, and the thicknesses of the outer layers A and C here may be identical or different.

The total thickness of the film of the invention may vary within certain limits. It is from 3 to 100 μm, in particular from 4 to 80 μm, preferably from 5 to 70 μm, the proportion made up by the layer B preferably being from 5 to 90% of the total thickness.

The polymers for the base layer B and the two outer layers A and C are fed to three extruders. Any foreign bodies or contamination present may be removed from the polymer melt by filtration prior to extrusion. The melts are then extruded through a coextrusion die to give flat melt films and layered one upon the other. The multilayer film is then drawn off and solidified with the aid of a chill roll and, where appropriate, other rollers.

The film of the invention is generally used by the coextrusion process known per se.

The procedure for this process is that the melts corresponding to the individual layers of the film are coextruded through a flat-film die, the resultant film is drawn off for solidification on one or more rollers, the film is then biaxially stretched (oriented), and the biaxially stretched film is heated and set and, where appropriate, corona- or flame-treated on the surface layer intended for treatment.

The biaxial stretching (orientation) is generally carried out sequentially, and preference is given to sequential biaxial stretching in which stretching is first longitudinal (in the machine direction) and then transverse (perpendicular to the machine direction).

As is usual in coextrusion, the polymer or the polymer mixture for the individual layers is first compressed and plasticized in an extruder, and any additives used may already be present in the polymer or the polymer mixture. The melts are then simultaneously extruded through a flat-film die (slot die), and the coextruded film is drawn off on one or more take-off rolls, whereupon the film cools and solidifies.

The biaxial orientation is generally carried out sequentially, preferably orienting first longitudinally (i.e. in the machine direction=MD) and then transversely (i.e. perpendicularly to the machine direction=TD). This gives orientation of the molecular chains. The longitudinal orientation can be carried out with the aid of two rolls running at different speeds corresponding to the desired stretching ratio. For the transverse orientation use is generally made of an appropriate tenter frame.

The temperature at which the orientation is carried out may vary over a relatively wide range and depends on the film properties desired. The longitudinal stretching is generally carried out at from about 80 to 130° C., and the transverse stretching at from about 90 to 150° C. The longitudinal stretching ratio is generally in the range from 2.5:1 to 6:1, preferably from 3:1 to 5.5:1. The transverse stretching ratio is generally in the range from 3.0:1 to 5.0:1, preferably from 3.5:1 to 4.5:1. Prior to the transverse stretching, one or both surfaces of the film may be in-line coated by known processes. The in-line coating may serve, for example, to give improved adhesion of the metal layer or of any printing ink subsequently to be applied, or else to improve antistatic performance or processing performance.

For producing a film with very good sealing properties, it has proven favorable for the planar orientation Δp of the film to be less than 0.165, in particular less than 0.163. In this instance, the strength of the film in the direction of its thickness is sufficiently great that when the seal seam strength is measured it is specifically the seal seam which is pulled apart, and there is no initiation or propagation of tearing within the film.

The significant variables affecting the planar orientation Δp have been found to be the longitudinal and transverse stretching parameters, and also the SV of the raw material used. The processing parameters include in particular the longitudinal and transverse stretching ratios ($\lambda_{MD}$ and $\lambda_{TD}$), the longitudinal and transverse stretching temperatures ($T_{MD}$ and $T_{TD}$), the film web speed and the nature of the stretching, in particular that in the longitudinal direction of the machine. For example, if a machine gives a planar orientation Δp=0.167 with the following set of parameters: $\lambda_{MD}$=4.8 and $\lambda_{TD}$=4.0, and longitudinal and transverse stretching temperatures $T_{MD}$=from 80 to 118° C. and $T_{TD}$=from 80 to 125° C., then increasing the longitudinal stretching temperature to $T_{MD}$=from 80 to 125° C., or increasing the transverse stretching temperature to $T_{TD}$=from 80 to 135° C., or lowering the longitudinal stretching ratio to $\lambda_{MD}$=4.3, or lowering the transverse stretching ratio to $\lambda_{TD}$3.7 gives a planar orientation $\Delta p$ within the desired range. The film web speed here was 340 m/min, and the SV of the material was about 730. In the case of longitudinal stretching, the data specified are based on what is known as N-TEP stretching, which is composed of a low-orientation stretching step (LOE=low-orientation elongation) and of a high-orientation stretching step (REP=rapid elongation process). With other stretching systems, the conditions are in principle the same, but the values for the respective process parameters may be slightly different. In the case of longitudinal stretching, the temperatures given are based on the respective roll temperatures, and in the case of transverse stretching they are based on the film temperatures measured by IR.

In the heat-setting which follows, the film is held for from about 0.1 to 10 s at a temperature of from 150 to 250° C. The film is then wound up in a conventional manner One or both surfaces of the film is/are preferably corona- or flame-treated by one of the known methods after biaxial stretching. The intensity of treatment is generally in the range above 45 mN/m.

The film may also be coated to establish other desired properties. Typical coatings are layers with adhesion-promoting, antistatic, slip-enhancing or release effect. It is, of course, possible for these additional layers to be applied to the film by in-line coating using aqueous dispersions prior to the transverse stretching step.

The film of the invention has excellent sealability, very good flame retardancy, very good handling, and very good processing performance. The sealable outer layer A of the film seals not only with respect to itself (fin sealing) but also with respect to the non-sealable outer layer C (lap sealing). The upward shift in minimum sealing temperature of lap sealing is only about 10 K, and the seal seam strength is inferior by not more than 0.3 N/15 mm.

In addition, it was possible to increase mattness while at the same time reducing the haze of the film with respect to films of the prior art. It has been ensured that during production of the film regrind can be reintroduced to the extrusion process at a concentration of from 20 to 60% by weight, based on the total weight of the film, without any significant resultant adverse effect on the physical properties of the film.

Due to the excellent sealing properties of the film, and due to its very good handling and very good processing properties, the film is particularly suitable for processing on high-speed machinery.

Due to its excellent combinations of properties, the film is moreover suitable for many varied applications, such as for interior decoration, for the construction of exhibition stands, for exhibition requisites, as displays, for placards, for protective glazing of machinery or of vehicles, in the lighting sector, in the fitting out of shops or of stores, as a promotional item or a laminating medium, or outdoors for greenhouses, roofing systems, exterior cladding, protective coverings for materials, such as steel sheets, construction sector applications, or for illuminated advertising profiles, blinds, or electrical applications.

The films and items produced therefrom are particularly suitable for outdoor applications where there is a requirement for fire protection or flame retardancy.

The outer layer C has a characteristic matt, non-reflective surface, and is therefore particularly attractive for the applications mentioned.

The table below (Table 1) gives the most important properties of the film of the invention.

TABLE 1

|  | Range of the invention | preferred | particularly preferred | Unit | Test method |
|---|---|---|---|---|---|
| Outer layer A |  |  |  |  |  |
| Minimum sealing temperature | <110 | <105 | <100 | ° C. | internal |
| Seal seam strength | >1.3 | >1.5 | >1.8 | N/15 mm | internal |
| Average roughness $R_a$ | <30 | <25 | <20 | nm | DIN 4768, cut-off 0.25 mm |
| Range of values measured for gas flow | 500–4000 | 800–3500 | 1000–3000 | sec | internal |
| Gloss, 20° | >120 | >130 | >140 |  | DIN 67 530 |
| Outer layer C |  |  |  |  |  |
| COF | <0.5 | <0.45 | <0.40 |  | DIN 53 375 |
| Average roughness $R_a$ | 200–1000 | 225–900 | 250–800 | nm | DIN 4768, cut-off 0.25 mm |
| Range of values measured for gas flow | <50 | <45 | <49 | sec | internal |
| Gloss, 60° | <60 | <55 | <50 |  | DIN 67 530 |
| Other film properties |  |  |  |  |  |
| Haze | <40 | <35 | <30 | % | ASTM-D 1003-52 |
| Planar orientation | <0.1650 | <0.163 | <0.160 |  | internal |
| Fire Performance | The film complies with construction materials classifications B2 and B1 to DIN 4102 Part 2/Part 1 and passes the UL 94 test |  |  |  |  |

In the examples below, each property was measured in accordance with the following standards or methods.

SV (DCA), IV (DVA)

Standard viscosity SV (DCA) is measured in dichloroacetic acid by a method based on DIN 53726.

Intrinsic viscosity (IV) is calculated as follows from standard viscosity $$IV(DCA)=6.67 \cdot 10^{-4} SV(DCA)+0.118$$

Determination of Minimum Sealing Temperature

Hot-sealed specimens (seal seam 20 mm×100 mm) were produced using a Brugger HSG/ET sealing apparatus, by sealing the film at different temperatures with the aid of two heated sealing jaws at a sealing pressure of 2 bar and with a sealing time of 0.5 s. From the sealed specimens, test strips of 15 mm width were cut. The T-seal seam strength was measured in the determination of seal seam strength. The minimum sealing temperature is the temperature at which a seal seam strength of at least 0.5 N/15 mm is achieved.

Seal Seam Strength

To determine seal seam strength, two film strips of width 15 mm were placed one on top of the other and sealed at 130° C. with a sealing time of 0.5 s and a sealing pressure of 2 bar (apparatus: Brugger model NDS, single-side-heated sealing jaw). The seal seam strength was determined by the T-Peel method.

Coefficient of Friction (COF)

Coefficient of friction was determined to DIN 53 375. The coefficient of sliding friction was measured 14 days after production.

Surface Tension

Surface tension was determined by what is known as the ink method (DIN 53 364).

Haze

Hölz haze was measured by a method based on ASTM-D 1003-52 but, in order to utilize the most effective measurement range, measurements were made on four pieces of film laid one on top of the other, and a 1° slit diaphragm was used instead of a 4° pinhole.

Gloss

Gloss was determined to DIN 67 530. Reflectance was measured, as an optical value characteristic of a film surface. Based on the standards ASTM-D 523-78 and ISO 2813, the angle of incidence was set at 20°. A beam of light hits the flat test surface at the set angle of incidence and is reflected and/or scattered thereby. A proportional electrical variable is displayed representing light rays hitting the photoelectronic detector. The value measured is dimensionless and must be stated together with the angle of incidence.

Surface Gas Flow Time

The principle of the test method is based on the air flow between one side of the film and a smooth silicon wafer sheet. The air flows from the surroundings into an evacuated space, and the interface between film and silicon wafer sheet acts as a flow resistance.

A round specimen of film is placed on a silicon wafer sheet in the middle of which there is a hole providing the connection to the receiver. The receiver is evacuated to a pressure below 0.1 mbar. The time in seconds taken by the air to establish a pressure rise of 56 mbar in the receiver is determined.

| Test conditions: | |
|---|---|
| Test area | 45.1 cm$^1$ |
| Weight applied | 1276 g |
| Air temperature | 23° C. |
| Humidity | 50% relative humidity |
| Aggreagated gas volume | 1.2 cm$^2$ |
| Pressure difference | 56 mbar |

Determination of Planar Orientation Δp

Planar orientation is determined by measuring the refractive index with an Abbe refractometer.

| Preparation of specimens | |
|---|---|
| Specimen size and length: | from 60 to 100 mm |
| Specimen width: | corresponds to prism width of 10 mm |

To determine $n_{MD}$ and $n_a$ (=$n_z$), the specimen to be tested has to be cut out from the film with the running edge of the specimen running precisely in the direction TD. To determine $n_{TD}$ and $n_a$ (=$n_z$), the specimen to be tested has to be cut out from the film, and the running edge of the specimen has to coincide exactly with the direction MD. The specimens are to be taken from the middle of the film web. Care must be taken that the temperature of the Abbe refractometer is 23° C. Using a glass rod, a little diiodomethane (N=1.745) or diiodomethane-bromonaphthalene mixture is applied to the lower prism, which has been cleaned thoroughly before the test. The refractive index of the mixture must be greater than 1.685. The specimen cut out in the direction TD is firstly laid on top of this, in such a way that the entire surface of the prism is covered. Using a paper wipe the film is now firmly pressed flat onto the prism, so that it is firmly and smoothly positioned thereon. The excess liquid must be sucked away. A little of the test liquid is then dropped onto the film. The second prism is swung down and into place and pressed firmly into contact. The right-hand knurled screw is then used to turn the indicator scale until a transition from light to dark can be seen in the field of view in the range from 1.62 to 1.68. If the transition from light to dark is not sharp, the colors are brought together using the upper knurled screw in such a way that only one light and one dark zone are visible. The sharp transition line is brought to the crossing point of the two diagonal lines (in the eyepiece) using the lower knurled screw. The value now indicated on the measurement scale is read off and entered into the test record. This is the refractive index $n_{MD}$ in the machine direction. The scale is now turned using the lower knurled screw until the range visible in the eyepiece is from 1.49 to 1.50.

The refractive index $n_a$ or $n_z$ (in the direction of the thickness of the film) is then determined. To improve the visibility of the transition, which is only weakly visible, a polarization film is placed over the eyepiece. This is turned until the transition is clearly visible. The same considerations apply as in the determination of $n_{MD}$. If the transition from light to dark is not sharp (colored), the colors are brought together using the upper knurled screw in such a way that a sharp transition can be seen. This sharp transition line is brought into the crossing point of the two diagonal lines using the lower knurled screw, and the value indicated on the scale is read off and entered into the table.

The specimen is then turned, and the corresponding refractive indices $n_{MD}$ and $n_a$ (=$n_z$) of the other side are measured and entered into an appropriate table.

After determining the refractive indices in, respectively, the direction MD and the direction of the thickness of the film, the specimen strip cut out in the direction MD is placed in position and the refractive indices $n_{TD}$ and $n_a$ (=$n_z$) are determined accordingly. The strip is turned over, and the values for the B side are measured. The values for the A side and the B side are combined to give average refractive indices. The orientation values are then calculated from the refractive indices using the following formulae:

$$\Delta n = n_{MD} - n_{TD}$$

$$\Delta p = (n_{MD} + n_{TD})/2 - n_z$$

$$n_{av} = (n_{MD} + n_{TD} + n_z)/3$$

Surface Defects

Surface defects were determined visually.

Mechanical Properties

Modulus of elasticity, tensile stress at break, and tensile strain at break are measured longitudinally and transversely to ISO 527-1-2.

Yellowness Index

Yellowness Index (YI) is the deviation from colorlessness in the "yellow" direction and was measured to DIN 6167. Yellowness Index values<5 are not visually detectable.

Fire Performance

Fire performance is determined to DIN 4102 Part 2, construction materials classification B2, and to DIN 4102 Part 1, construction materials classification B1, and also by the UL 94 test.

EXAMPLES

The examples and comparative examples below each concern films of varying thickness, produced by a known extrusion process.

Example 1

Chips made from polyethylene terephthalate (produced by the transesterification process using Mn as transesterification catalyst, Mn concentration: 100 ppm) were dried at 150° C. to residual moisture below 100 ppm, and fed to the extruder for the base layer B. Similarly, chips made from polyethylene terephthalate and a filler were fed to the extruder for the non-sealable outer layer C.

Alongside, chips were produced from a linear polyester composed of an amorphous copolyester comprising 78 mol % of ethylene terephthalate and 22 mol % of ethylene isophthalate (prepared by the transesterification process using Mn as transesterification catalyst, Mn concentration: 100 ppm). The copolyester was dried at a temperature of 100° C. to residual moisture below 200 ppm and fed to the extruder for the sealable outer layer A.

The hydrolysis stabilizer and the flame retardant are fed in the form of a masterbatch. The masterbatch is composed of 20% by weight of flame retardant, 1% by weight of hydrolysis stabilizer, and 79% by weight of polyethylene terephthalate. The hydrolysis stabilizer is pentaerythritol tetrakis-3-(3,5-di-tert-butyl-4-hydroxyphenyl)propionate. The flame retardant is dimethyl phosphonate ®Armgard P 1045). The masterbatch has bulk density of 750 kg/m³ and a softening point of 69° C.

The masterbatch was charged at room temperature from separate feed vessels within a vacuum dryer which from the time of charging to the end of the residence time traverses a temperature profile from 25 to 130° C. During the residence time of about 4 hours, the masterbatch is stirred at 61 rpm. The precrystallized or predried masterbatch is after-dried in the downstream hopper, likewise at subatmospheric pressure, for 4 hours at 140° C.

10% by weight of the masterbatch are added to the base layer B, and 20% by weight of the masterbatch are added to the non-sealable outer layer C.

Coextrusion followed by stepwise longitudinal and transverse orientation was used to produce a transparent three-layer film with ABC structure and a total thickness of 12 μm. Table 2 gives the thickness of each of the outer layers.

| Outer layer A, a mixture made from: | |
|---|---|
| 97.0% by weight of | copolyester with SV 800 |
| 3.0% by weight of | masterbatch made from 97.75% by weight of copolyester (SV 800) smf 1.0% by weight of ® Sylobloc 44 H (synthetic SiO₂ from Grace), and 1.25% by weight of ® Aerosil TT 600 (fumed SiO₂ from Degussa) |
| Base layer B: | |
| 90.0% by weight of | polyethylene terephthalate with SV 800 |
| 10.0% by weight of | masterbatch which comprises flame retardant and hydrolysis stabilizer |
| Outer layer C, a mixture made from: | |
| 20.0% by weight of | masterbatch which comprises flame retardant and hydrolysis stabilizer, |
| 65.0% by weight of | polyethylene terephthalate with SV 800 (= component I) |
| 15.0% by weight of | component II |

Component II was prepared as described in Example 1 of EP-A-0 144 878.

The production conditions in each of the steps of the process were:

| Extrusion: | Temperatures | Layer A: | 270° C. |
|---|---|---|---|
| | | Layer B: | 290° C. |
| | | Layer C: | 290° C. |
| | Die gap width: | | 2.5 mm |
| | Take-off roll temperature: | | 30° C. |
| Longitudinal stretching: | Temperature: | | 80–125° C. |
| | Longitudinal stretching ratio: | | 4.2 |
| Transverse stretching: | Temperature: | | 80–135° C. |
| | Transverse stretching ratio: | | 4.0 |
| Setting: | Temperature: | | 230° C. |
| Duration: | | | 3 s |

The film had the required good sealing properties, and the desired mattness, and has the desired handling and the desired processing performance. Tables 2 and 3 show the structure of the films and the properties achieved in films produced in this way.

The mechanical properties are unaltered after 200 hours of heat-conditioning at 100° C. in a circulating-air drying cabinet. The film exhibits no embrittlement phenomena of any type. The film complies with construction materials classifications B2 and B1 to DIN 4102 Part 2 and Part 1. The film passes the UL 94 test.

Example 2

Using Example 1 as a basis, the outer layer thickness for the sealable layer A was raised from 1.5 to 2.0 μm. The result is an improvement in sealing properties, and in particular a marked increase in seal seam strength.

Example 3

Using Example 1 as a basis, the film now produced has a thickness of 20 μm. The outer layer thickness for the sealable layer A was 2.5 μm and that for the non-sealable layer C was 2.0 μm. The result was again an improvement in sealing properties, in particular a marked increase in seal seam strength. There was a marginal improvement in the handling of the film.

Example 4

Using Example 3 as a basis, the copolymer for the sealable outer layer A was changed. Instead of the amorphous copolyester having 78 mol % of polyethylene terephthalate and 22 mol % of ethylene terephthalate, use was now made of an amorphous copolyester having 70 mol % of polyethylene terephthalate and 30 mol % of ethylene terephthalate. The raw material was processed in a vented twin-screw extruder, with no need for predrying. The outer layer thickness of the sealable layer A was again 2.5 μm and that of the non-sealable layer C was 2.0 μm. The result was an improvement in sealing properties, in particular a marked increase in seal seam strength. To achieve good handling and good processing performance of the film, the pigment concentration in the two outer layers was slightly raised.

Comparative Example 1

Using Example 1 as a basis, the sealable outer layer A was now not pigmented. Although the result was some improvement in sealing properties, there was an unacceptable deterioration in the handling of the film and the processing performance.

Comparative Example 2

Using Example 1 as a basis, the sealable outer layer A was now pigmented at the same level as the non-sealable outer layer C. This measure improved the handling and the processing properties of the film, but there was a marked deterioration in the sealing properties.

Comparative Example 3

Using Example 1 as a basis, a markedly lower pigment level was now used in the non-sealable outer layer A. There was a marked deterioration in the handling of the film and the processing performance of the film.

Comparative Example 4

Example 1 of EP-A-0 035 835 was repeated. The sealing performance of the film, the handling of the film, and the processing performance of the film is poorer than in the inventive examples.

TABLE 2

| Example | Film thickness μm | Film structure | Layer thicknesses μm A | B | C | Pigments in layers A | B | C | Average pigment diameter in layers μm A | B | C | Pigment concentrations ppm A | B | C |
|---|---|---|---|---|---|---|---|---|---|---|---|---|---|---|
| E1 | 12 | ABC | 1.5 | 9 | 1.5 | Sylobloc 44 H Aerosil TT 600 | none | 0 | 2.5 0.04 | | 2.5 0.04 | 3e + 05 | 0 | 0 |
| E2 | 12 | ABC | 2 | 8.5 | 1.5 | Sylobloc 44 H Aerosil TT 600 | none | 0 | 2.5 0.04 | | 2.5 0.04 | 3e + 05 | 0 | 0 |
| E3 | 20 | ABC | 2.5 | 16 | 2 | Sylobloc 44 H Aerosil TT 600 | none | 0 | 2.5 0.04 | | 2.5 0.04 | 3e + 05 | 0 | 0 |
| E4 | 20 | ABC | 2.5 | 16 | 2 | Sylobloc 44 H Aerosil TT 600 | none | 0 | 2.5 0.04 | | 2.5 0.04 | 4e + 05 | 0 | 0 |
| CE1 | 12 | ABC | 1.5 | 9 | 1.5 | none | none | Sylobloc 44 H Aerosil TT 600 | | | 2.5 0.04 | | 0 | 12001500 |
| CE2 | 12 | ABC | 1.5 | 9 | 1.5 | Sylobloc 44 H Aerosil TT 600 | none | Sylobloc 44 H Aerosil TT 600 | 2.5 0.04 | | 2.5 0.04 | 3e + 05 | 0 | 12001500 |
| CE3 | 12 | ABC | 1.5 | 9 | 1.5 | Sylobloc 44 H Aerosil TT 600 | none | Sylobloc 44 H Aerosil TT 600 | 2.5 0.04 | | 2.5 0.04 | 3e + 05 | 0 | 600750 |
| CE4 | 15 | AB | 2.3 | 13 | | Gasil 35 EP-A 035 835 | none | | 3 | | | 2500 | 0 | |

TABLE 3

| Example | Minimum sealing temperature Side A with respect to side A | Seal seam strength Side A with respect to side A | Coefficient of friction COF Side C with respect to side C | Average roughness $R_a$ Side A | Side C | Values measured for gas flow Side A | Side C | Δp | Gloss Side A | Side C | Haze | Winding performance and handling | Processing performance |
|---|---|---|---|---|---|---|---|---|---|---|---|---|---|
| E1 | 100 | 2 | 0.45 | 25 | 340 | 1200 | 20 | 0.165 | 140 | 50 | 32 | + | + |
| E2 | 98 | 2.7 | 0.45 | 26 | 340 | 1280 | 20 | 0.165 | 140 | 50 | 32 | + | + |
| E3 | 95 | 3 | 0.41 | 23 | 340 | 1110 | 20 | 0.165 | 130 | 45 | 34 | + | + |

TABLE 3-continued

| Example | Minimum sealing temperature Side A with respect to side A | Seal seam strength Side A with respect to side A | Coefficient of friction COF Side C with respect to side C | Average roughness $R_a$ Side A | Average roughness $R_a$ Side C | Values measured for gas flow Side A | Values measured for gas flow Side C | Δp | Gloss Side A | Gloss Side C | Haze | Winding performance and handling | Processing performance |
|---|---|---|---|---|---|---|---|---|---|---|---|---|---|
| E4  | 85  | 3.3  | 0.4  | 23 | 340 | 1300  | 20   | 0.165 | 130 | 45  | 34  | + | + |
| CE1 | 98  | 2.1  | 0.45 | 10 | 65  | 10000 | 80   | 0.165 | 160 | 170 | 1.5 | − | − |
| CE2 | 110 | 1    | 0.45 | 65 | 65  | 80    | 80   | 0.165 | 130 | 170 | 2.8 | − | − |
| CE3 | 100 | 2    | 0.45 | 25 | 37  | 1200  | 150  | 0.165 | 160 | 190 | 1.5 | − | − |
| CE4 | 115 | 0.97 | >2   | 70 | 20  | 50    | >5000 |      |     |     | 12  | − | − |

Key to winding performance and handling and to processing performance of films:
++: no tendency to stick to rollers or to other mechanical parts, no blocking problems on winding or during processing on packaging machinery, low production costs
−: tendency to stick to rollers or to other mechanical parts, blocking problems on winding or during processing on packaging machinery, high production costs due to complicated handling of film in the machinery

What is claimed is:

1. A sealable, flame-retardant, coextruded, biaxially oriented polyester film with one matt side and with at least one base layer B based on a thermoplastic polyester, and with a sealable outer layer A, and also with a matt outer layer C, wherein a flame retardant is present in at least one layer, wherein the sealable outer layer A has a minimum sealing temperature of about 110° C. and a seal seam strength of at least 1.3 N/15 mm, and the topographies of the two outer layers A and C have the following features:

Sealable outer layer A:
        $R_3$<about 30 nm
        Value measured for gas flow from about 500 to about 4000 s
    Non-sealable, matt outer layer C:
        about 200 nm<$R_a$<about 1000 nm
        Value measured for gas flow <about 50 s.

2. The film as claimed in claim 1, wherein the sealable outer layer A comprises an amorphous copolyester which has been built up from ethylene terephthalate units and ethylene isophthalate units and from ethylene glycol units.

3. The film as claimed in claim 2, wherein the amorphous copolyester of the sealable outer layer A comprises from 40 to 95 mol % of ethylene terephthalate and from 60 to 5 mol % of ethylene isophthalate.

4. The film as claimed in claim 2, wherein the amorphous copolyester of the sealable outer layer A contains from about 50 to about 90 mol % of ethylene terephthalate and from 50 to 10 mol % of ethylene isophthalate.

5. The film as claimed in claim 2, wherein the amorphous copolyester of the sealable outer layer A contains from about 60 to about 85 mol % of ethylene terphthalate and from 40 to 15 mol % of ethylene isophthalate.

6. The film as claimed in claim 1, wherein the matt outer layer C comprises a blend or a mixture made from two components I and II.

7. The film as claimed in claim 6, wherein the matt outer layer further comprises additives in the form of inert inorganic antiblocking agents.

8. The film as claimed in claim 1, wherein the concentration of the flame retardant is in the range from about 0.5 to about 30.0% by weight based on the weight of the respective layer of the polyester used.

9. The film as claimed in claim 8, wherein the concentration of the flame retardant is in the range from about 1.0 to about 20.0% by weight,.

10. The film as claimed in claim 1, wherein the flame retardant is selected from organophosphorus compounds.

11. The film as claimed in claim 1, wherein the flame retardant is selected from one or more of carboxyphosphinic acids, anhydrides of these, and dimethyl methylphosphonate.

12. The film as claimed in claim 1, wherein recycled material is present at a concentration of up to about 60% by weight, based on the total weight of the film.

13. A process for producing a film according to claim 1 with at least one base layer B based on a thermoplastic polyester, and with a sealable outer layer A, and also with a matt outer layer C, wherein at least one layer comprises a flame retardant, wherein melts corresponding to the individual layers of the film are coextruded through a flat-film die, the resultant film is drawn off on one or more rollers for solidification, and then the film is biaxially stretched (oriented) and the biaxially stretch film is heat-set.

14. The process as claimed in claim 13, wherein the flame retardant is added by way of masterbatch technology, and where the masterbatch has been precrystallized or predried or precrystallized and predried.

15. The process as claimed in claim 14, wherein the percentage ratio by weight of flame retardant to thermoplastic in the masterbatch is from about 60:about 40 to about 10:about 90.

16. The process as claimed in claim 14, wherein the masterbatch also comprises a hydrolysis stabilizer in the form of a phenolic stabilizer, one or more of alkali metal stearate, alkaline earth metal stearates, alkali metal carbonate and alkaline earth metal carbonate, in amounts of from about 0.05 to about 0.6% by weight.

17. The process as claimed in claim 16, wherein the hydrolysis stabilizer is present in an amount of from about 0.15 to about 0.3% by weight, and with a molar mass of more than about 500 g/mol.

18. The process as claimed in claim 13, wherein the film is corona- or flame-treated on the surface layer intended for treatment.

19. A method of making an interior decoration, a display, a placards, a protective glazing, a shop outfit, a promotional requisite, a laminating medium, an exterior cladding, a protective covering, an illuminated advertising profile, or a blind, which comprises converting a film as claimed in claim 1 into an interior decoration, a display, a placards, a protective glazing, a shop outfit, a promotional requisite, a laminating medium, an exterior cladding, a protective covering, an illuminated advertising profile, or a blind.

* * * * *